(12) United States Patent
Hoshi et al.

(10) Patent No.: US 7,621,142 B2
(45) Date of Patent: Nov. 24, 2009

(54) COOLING SYSTEM AND HYBRID VEHICLE INCLUDING COOLING SYSTEM

(75) Inventors: Jun Hoshi, Toyota (JP); Kazuhiro Maeda, Nishikamo-gun (JP); Susumu Ichikawa, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 399 days.

(21) Appl. No.: 11/121,059

(22) Filed: May 4, 2005

(65) Prior Publication Data

US 2005/0257563 A1 Nov. 24, 2005

(30) Foreign Application Priority Data

May 20, 2004 (JP) ............... 2004-150358

(51) Int. Cl.
*B60H 1/32* (2006.01)

(52) U.S. Cl. ............... 62/244; 62/507; 165/42; 165/140

(58) Field of Classification Search ............ 62/507, 62/134, 186, 228.4, 230, 244, 259.2, 228.1, 62/239; 165/204, 42, 43, 244, 140–141; 236/10
See application file for complete search history.

(56) References Cited

U.S. PATENT DOCUMENTS

| 4,651,816 | A | | 3/1987 | Struss et al. |
| 4,756,279 | A | | 7/1988 | Temmesfeld |
| 5,503,944 | A | * | 4/1996 | Meyer et al. ............ 429/13 |
| 6,106,228 | A | | 8/2000 | Bartlett |
| 6,874,570 | B2 | | 4/2005 | Horiuchi |
| 6,978,628 | B2 | | 12/2005 | Honda |
| 7,273,672 | B2 | * | 9/2007 | Sone et al. ............ 429/39 |
| 2003/0089319 | A1 | * | 5/2003 | Duvinage et al. ........ 123/41.02 |
| 2004/0060312 | A1 | * | 4/2004 | Horn et al. ............ 62/244 |
| 2005/0279113 | A1 | | 12/2005 | Hoshi et al. |
| 2006/0113068 | A1 | * | 6/2006 | Desai et al. ............ 165/140 |

FOREIGN PATENT DOCUMENTS

| JP | 60-110625 | 7/1985 |
| JP | 1-144227 U | 10/1989 |
| JP | 6-10671 A | 1/1994 |
| JP | A 2000-18880 | 1/2000 |
| JP | 2000-315513 A | 11/2000 |
| JP | 2000-329494 A | 11/2000 |
| JP | A 2001-174168 | 6/2001 |
| JP | 2003-034130 A | 2/2003 |

OTHER PUBLICATIONS

English Language Office Action, U.S. Appl. No. 11/150,140 mailed May 18, 2007.

* cited by examiner

*Primary Examiner*—William E Tapolcai
(74) *Attorney, Agent, or Firm*—Kenyon & Kenyon LLP

(57) ABSTRACT

A FC radiator in a FC cooling system, an EV radiator in a driving device cooling system, and a condenser in an air conditioning cooling system are arranged in one plane substantially perpendicular to a direction in which a fuel cell vehicle moves forward at a front portion of the fuel cell. Also, heat exchangers are arranged in order of the condenser, the EV radiator, and the FC radiator, that is, in order of an operating temperature from an upper position to a lower position. An angle of plural fins fitted to a front grille is changed according to a load of a fuel cell and a vehicle speed, each of the plural fins being formed to have an elongate rectangular plate shape extending in a horizontal direction.

26 Claims, 8 Drawing Sheets

COOLING SYSTEM AND HYBRID VEHICLE INCLUDING COOLING SYSTEM

INCORPORATION BY REFERENCE

The disclosure of Japanese Patent Application No. 2004-150358 filed on May 20, 2004, including the specification, drawings and abstract is incorporated herein by reference in its entirety.

BACKGROUND OF THE INVENTION

1. Field of the Invention

The invention relates to a cooling system and a hybrid vehicle including the cooling system. More specifically, the invention relates to a cooling system installed in a moving body, and a hybrid vehicle as the moving body including the cooling system.

2. Description of the Related Art

An example of such a cooling system is disclosed in Japanese Patent Application Publication No. JP (A) 2001-174168. As shown in FIG. 1 of the Japanese Patent Application Publication No. JP (A) 2001-174168, the cooling system includes two heat exchangers, that are, a heat exchanger for an electronic component (hereinafter, referred to as "electronic component heat exchanger") through which coolant for the electronic component flows, and a heat exchanger for a cooling medium (hereinafter, referred to as "cooling medium heat exchanger") through which a cooling medium for a freezing cycle flows, the two heat exchangers being arranged in one plane. In this cooling system, the electronic component heat exchanger is arranged in an upper position, and the cooling medium heat exchanger is arranged in a lower position; and a passage for the cooling medium in the cooling medium heat exchanger is a winding passage that extends from an upper position to a lower position, and has three levels, and the lowest portion is a condensing portion. Thus, an amount of heat transmitted to the condensing portion from the electronic component heat exchanger is decreased. Accordingly, it becomes unnecessary to provide a thermal insulation portion between the electronic component heat exchanger and the cooling medium heat exchanger.

However, in the case of the aforementioned cooling system, consideration is not given to cooling of a driving source which generates a larger amount of heat than an amount of heat generated by the electronic component. The cooling system installed in a moving body such as an automobile includes a heat exchanger for a driving source (hereinafter, referred to as "driving source heat exchanger") which is used for cooling the driving source for moving the moving body, in addition to a heat exchanger for air conditioning (hereinafter, referred to as "air conditioning heat exchanger") which is used for air conditioning in a passenger compartment. The cooling may become insufficient, depending on a position of the driving source heat exchanger.

SUMMARY OF THE INVENTION

It is an object of the invention to more appropriately arrange a heat exchanger for air conditioning which is used in an air conditioning system for a passenger compartment of a moving body and a heat exchanger for a driving source which is used for cooling the driving source of the moving body, in a cooling system. It is another object of the invention to cause a heat exchanger for air conditioning which is used in an air conditioning system for a passenger compartment of a moving body to function more efficiently, and to cause a heat exchanger for a driving source which is used for cooling the driving source of the moving body to function more efficiently, in a cooling system. It is yet another object of the invention to more appropriately arrange a heat exchanger for air conditioning which is used in an air conditioning system for a passenger compartment and a heat exchanger for a driving source which is used for cooling the driving source, and to cause the heat exchangers to function more efficiently, in a hybrid vehicle.

In order to achieve at least a part of the aforementioned objects, a cooling system according to the invention, and a hybrid vehicle including the cooling system according to the invention are configured as follows.

A first aspect of the invention relates to a cooling system which is installed in a moving body. In this cooling system, plural heat exchangers including a heat exchanger for air conditioning which is used in an air conditioning system for a passenger compartment of the moving body and a heat exchanger for a driving source which is used for cooling the driving source of the moving body are arranged in one plane substantially perpendicular to a direction in which the moving body moves, at a front portion of the moving body.

In the cooling system according to the first aspect of the invention, the plural heat exchangers including the heat exchanger for air conditioning which is used in the air conditioning system for the passenger compartment of the moving body and the heat exchanger for the driving source which is used for cooling the driving source of the moving body are arranged in one plane substantially perpendicular to the direction in which the moving body moves, at the front portion of the moving body. Therefore, cooling air that is introduced when the moving body moves can be supplied directly to the heat exchanger for air conditioning and the heat exchanger for the driving source. Accordingly, the heat exchanger for air conditioning and the heat exchanger for the driving source can be caused to function more efficiently. That is, the heat exchanger for air conditioning and the heat exchanger for the driving source can be more appropriately arranged.

A second aspect of the invention relates to a cooling system which is installed in a moving body. In the cooling system, all of plural heat exchangers including a heat exchanger for air conditioning which is used in an air conditioning system for a passenger compartment of the moving body, and which performs heat exchange with outside air, and a heat exchanger for a driving source which is used for cooling the driving source of the moving body, and which performs heat exchange with the outside air are arranged in one plane orthogonal to a longitudinal direction of the moving body, at a front portion of the moving body, according to heat loads of objects to be cooled by the heat exchangers.

In the cooling system according to the second aspect of the invention, all of the plural heat exchangers including the heat exchanger for air conditioning which is used in the air conditioning system for the passenger compartment of the moving body, and which performs heat exchange with outside air, and the heat exchanger for the driving source which is used for cooling the driving source of the moving body, and which performs heat exchange with the outside air are arranged in one plane orthogonal to the longitudinal direction of the moving body, at the front portion of the moving body, according to the heat loads of the objects to be cooled by the heat exchangers. Therefore, cooling air that is introduced when the moving body moves can be supplied directly to each of the heat exchangers and a flow rate of the cooling air that is supplied to each of the heat exchangers can be set according to the heat load of the object to be cooled by the heat exchanger. Accordingly, it is possible to reduce the possibility that cooling of the heat exchangers becomes insufficient due to upward and downward flows of the cooling air that is introduced when the vehicle runs. Thus, the heat exchanger for air conditioning and the heat exchanger for the driving source can be caused to function more efficiently.

A third aspect of the invention relates to a hybrid vehicle. The hybrid vehicle includes the cooling system according to the first aspect or the second aspect of the invention. That is, basically, the hybrid vehicle includes a cooling system in which plural heat exchangers including a heat exchanger for air conditioning which is used in an air conditioning system for a passenger compartment of the hybrid vehicle and a heat exchanger for a driving source which is used for cooling the driving source of the hybrid vehicle are arranged in one plane substantially perpendicular to a direction in which the hybrid vehicle moves, at a front portion of the hybrid vehicle, or the hybrid vehicle includes a cooling system in which all of plural heat exchangers including a heat exchanger for air conditioning which is used in an air conditioning system for a passenger compartment of the hybrid vehicle, and which performs heat exchange with outside air, and a heat exchanger for a driving source which is used for cooling the driving source of the hybrid vehicle, and which performs heat exchange with the outside air are arranged in one plane orthogonal to a longitudinal direction of the hybrid vehicle, at a front portion of the hybrid vehicle, according to heat loads of objects to be cooled by the heat exchangers.

Since this hybrid vehicle includes the cooling system according to the first aspect or the second aspect of the invention, it is possible to obtain the same effects as those obtained in the cooling system according to the first aspect or the second aspect of the invention. For example, it is possible to obtain the effect of causing the heat exchanger for air conditioning and the heat exchanger for the driving source to function more efficiently, and the effect of more appropriately arranging the heat exchanger for air conditioning and the heat exchanger for the driving source.

BRIEF DESCRIPTION OF THE DRAWINGS

The foregoing and further objects, features and advantages of the invention will become apparent from the following description of preferred embodiments with reference to the accompanying drawings wherein like numerals are used to represent like elements and wherein.

DETAILED DESCRIPTION OF THE PREFERRED EMBODIMENTS

Next, an exemplary embodiment of the invention will be described.

Figure 1:
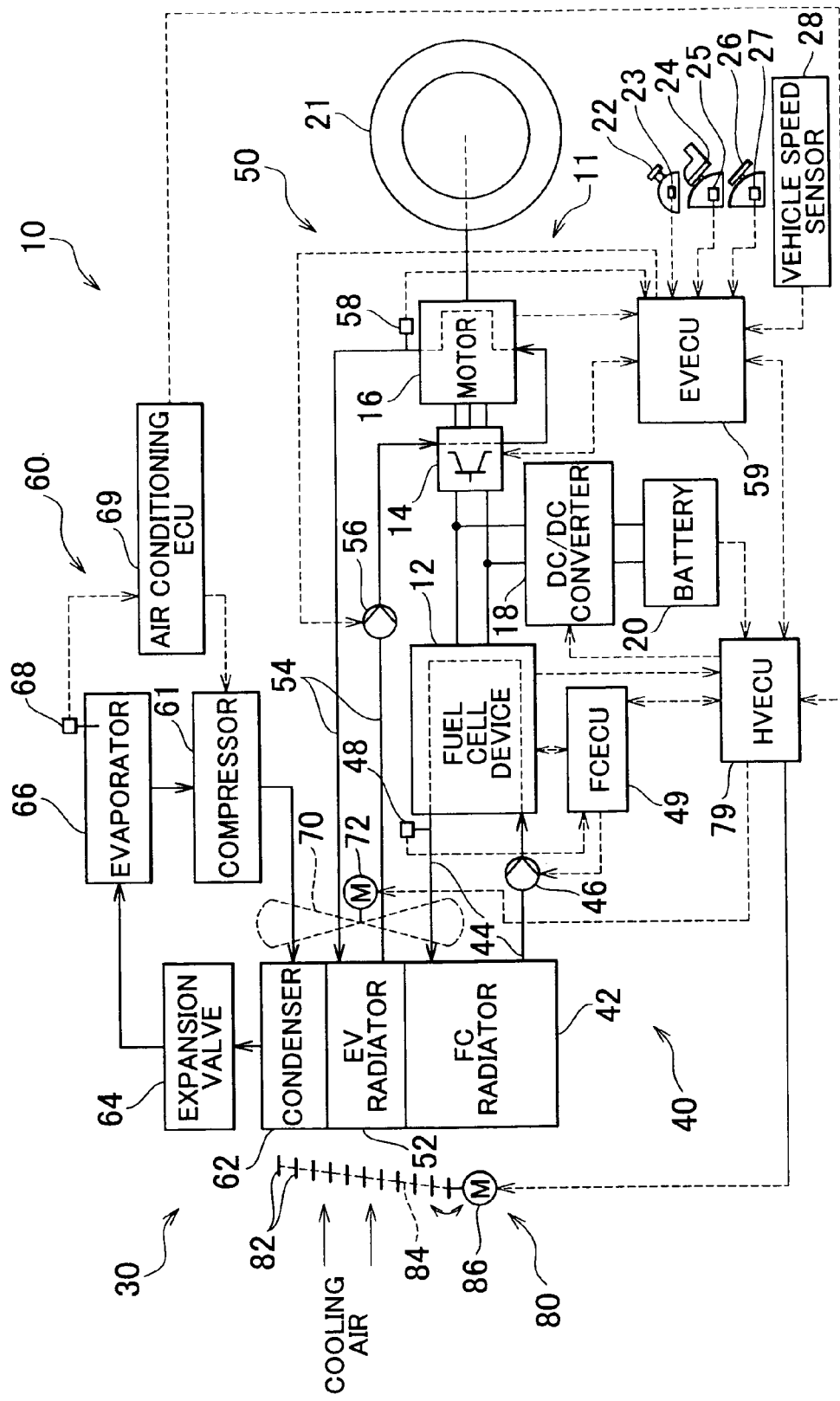
FIG. 1 is a diagram showing an outline of a configuration of a fuel cell vehicle 10 including a cooling system 30 according to an embodiment of the invention.
Figure 2:
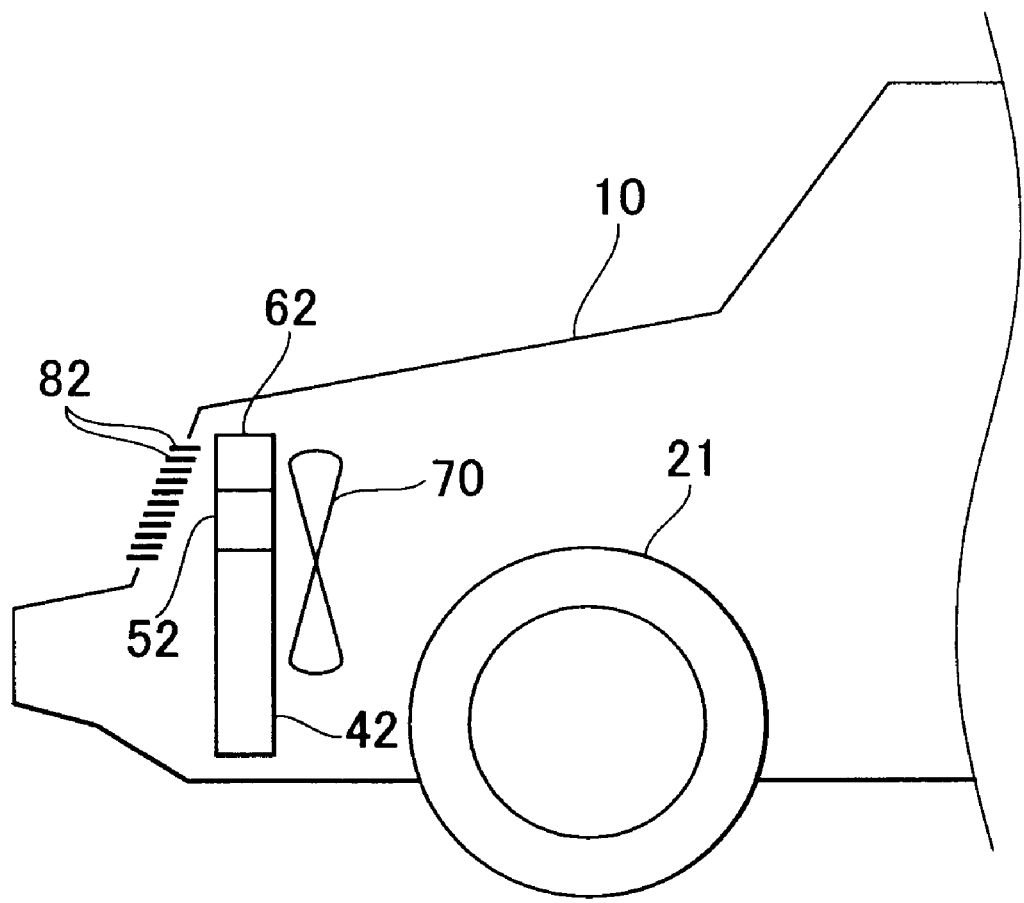
FIG. 2 is an explanatory diagram showing an example of arrangement of heat exchangers of the cooling system 30 according to the embodiment of the invention.

FIG. 1 is a diagram showing an outline of a configuration of a fuel cell vehicle 10 including a cooling system 30 according to an embodiment of the invention. FIG. 2 is an explanatory diagram showing an example of arrangement of heat exchangers of the cooling system 30 according to the embodiment of the invention. The fuel cell vehicle 10 in the embodiment includes a driving system 11 and a cooling system 30. The driving system 11 includes a fuel cell device 12 including a polymer electrolyte fuel cell stack, as an electric power source; an inverter 14 which converts direct electric current from the fuel cell device 12 to three phase alternating current; a motor for running 16 which drives a driving wheel 21 using the three phase alternating current from the inverter 14; a DC/DC converter 18 which is connected to two lines connecting the motor for running 16 to the fuel cell device 12; and a battery 20 which is charged with electric current, and from which electric current is discharged using the DC/DC converter 18. The cooling system 30 includes a cooling system for a fuel cell (hereinafter, referred to as "FC cooling system") 40 which cools a fuel cell stack (not shown) of the fuel cell device 12; a cooling system for driving devices (hereinafter, referred to as "driving device cooling system) 50 which cools the inverter 14 and the motor for running 16; an air conditioning cooling system 60 which is a part of air conditioning equipment for a passenger compartment; a fan 70 which is provided behind a radiator; and a cooling air direction changing device 80 which changes a direction of cooling air that is introduced when a vehicle runs.

The FC cooling system 40 includes a radiator for the fuel cell (hereinafter, referred to as "FC radiator") 42; a communication pipe 44; a pump 46; a temperature sensor 48; and an electronic control unit for the fuel cell (hereinafter, referred to as "FCECU") 49. The FC radiator 42 cools coolant that is a cooling medium using heat exchange with the cooling air that is introduced when the vehicle runs. The communication pipe 44 connects a coolant passage of the FC radiator 42 to a coolant passage formed in the fuel cell stack such that a circulation passage is formed. The pump 46 is provided in the communication pipe 44, and circulates the coolant in the circulation passage. The temperature sensor 48 is fitted to the communication pipe 44 at a portion in the vicinity of an outlet of the fuel cell stack, and detects a coolant temperature Twfc. The FCECU 49 controls driving of the pump 46 based on the coolant temperature Twfc detected by the temperature sensor 48, and sets a request Frq1 relating to driving of the fan 70 (hereinafter, referred to as "driving request Frq1 for the fan 70") based on the coolant temperature Twfc. In this embodiment, the FCECU 49 selects and sets one of "a high level", "a medium level", "a low level", and "stop", as the driving request Frq1 for the fan 70. The FCECU 49 not only controls driving of the pump 46 in the FC cooling system 40 and sets the driving request Frq1 for the fan 70, but also controls operation of the fuel cell device 12. Accordingly, the FCECU 49 serves as both of a control device for the FC cooling system 40 and a control device for the fuel cell device 12 in the driving system 11.

The driving device cooling system 50 includes a radiator for an electric vehicle (EV) (hereinafter, referred to as "EV radiator") 52; a communication pipe 54; a pump 56; a temperature sensor 58; and an electronic control unit for the EV (hereinafter, referred to as "EVECU") 59. The EV radiator 52 cools the coolant that is the cooling medium using heat exchange with the cooling air that is introduced when the vehicle runs. The communication pipe 54 connects a coolant passage of the EV radiator 52 to coolant passages formed in the inverter 14 and the motor for running 16 such that a circulation passage is formed. The pump 56 is provided in the communication pipe 54, and circulates the coolant in the circulation passage. The temperature sensor 58 is fitted to the communication pipe 54 at a portion in the vicinity of an outlet of the motor for running 16, and detects a coolant temperature Twmg. The EVECU 59 controls driving of the pump 56 based on the coolant temperature Twmg detected by the temperature sensor 58, and sets a request Frq2 relating to driving of the fan 70 (hereinafter, referred to as "driving request Frq2 for the fan 70") based on the coolant temperature Twmg. The EVECU 59 selects and sets one of "the high level". "the medium level", "the low level", and "stop", as the driving request Frq2 for the fan 70, as in the case of the driving request Frq1. The EVECU 59 not only controls driving of the pump 56 in the driving device cooling system 50 and sets the driving request Frq2 for the fan 70, but also calculates driving torque to be output to the driving wheel 21, and controls the inverter 14 such that the calculated driving torque is output from the motor for running 16. The EVECU 59 calculates the driving torque based on a position of a shift lever 22 detected by a shift position sensor 23; an accelerator pedal operation amount corresponding to a depression amount of an accelerator pedal 24, which is detected by an accelerator pedal position sensor 25; a brake pedal position showing a depression amount of a brake pedal 26, which is detected by a brake pedal position sensor 27; a vehicle speed V detected by a vehicle speed sensor 28; a rotational position of a rotor of the motor for running 16, which is detected by a rotational position detection sensor (not shown); phase current applied to the motor for running 16, which is detected by a current sensor (not shown) fitted in the inverter 14, and the like. Accordingly, the EVECU 59 serves as both of a control device for the driving device cooling system 50 and a control device for the motor for running 16 in the driving system 11.

The air conditioning cooling system 60 is configured as a circulation passage in which the cooling medium is circulated. The air conditioning cooling system 60 includes a compressor 61; a condenser 62; an expansion valve 64: an evaporator 66; and an electronic control unit for air conditioning (hereinafter, referred to as "air conditioning ECU") 69. The compressor 61 compresses the cooling medium so that the cooling medium is brought into a high-temperature and high-pressure gas state. The condenser 62 cools the compressed cooling medium using outside air so that the cooling medium is brought into a high-pressure liquid state. The expansion valve 64 rapidly expands the cooled cooling medium so that the cooling medium is brought into a low-temperature and low-pressure mist state. The evaporator 66 evaporates the low-temperature and low-pressure cooling medium using heat exchange between the low-temperature and low-pressure cooling medium and air in the passenger compartment so that the cooling medium is brought into a low-temperature and low-pressure gas state. The air conditioning ECU 69 controls driving of the compressor 61 based on a temperature of the cooling medium, which is detected by a cooling medium temperature sensor 68 fitted to the evaporator 66. Also, the air conditioning ECU 69 sets a request Frq3 relating to driving of the fan 70 (hereinafter, referred to as "driving request Frq3 for the fan 70"), based on the temperature of the cooling medium. The air conditioning ECU 69 selects and sets one of "the high level". "the medium level". "the low level", and "stop", as the driving request Frq3 for the fan 70, as in the cases of the driving requests Frq1 and Frq2.

The FC radiator 42 in the FC cooling system 40, the EV radiator 52 in the driving device cooling system 50, and the condenser 62 in the air conditioning cooling system 60 are arranged in one plane substantially perpendicular (orthogonal) to a direction in which the fuel cell vehicle 10 moves forward (i.e., a longitudinal direction of the fuel cell vehicle 10) at a front portion of the fuel cell vehicle 10, as shown in FIG. 2. Also, the heat exchangers are arranged in order of the condenser 62, the EV radiator 52, and the FC radiator 42, that is, in order of an operating temperature at the time of heat exchange, from an upper position to a lower position. Further, areas of the FC radiator 42, the EV radiator 52, and the condenser 62 are set according to heat loads of the objects to be cooled by the FC radiator 42, the EV radiator 52, and the condenser 62, respectively. As the heat load of the object to be cooled by the heat exchanger increases, the operating temperature of the heat exchanger at the time of heat exchange increases. In this embodiment, the operating temperature of the condenser 62 at the time of heat exchange is 40° C. to 60° C., the operating temperature of the EV radiator 52 at the time of heat exchange is 50° C. to 70° C., and the operating temperature of the FC radiator 42 at the time of heat exchange is 65° C. to 85° C. Thus, the operating temperature of the polymer electrolyte fuel cell stack installed as the driving source is lower than the operating temperature of an internal combustion engine installed as the driving source. Therefore, a gas-liquid temperature difference in the radiator is small when the polymer electrolyte fuel cell stack is installed as the driving source. Therefore, the position at which the FC radiator 42 is installed is important. Since the heat exchangers in the cooling systems 40, 50, and 60 (i.e., the FC radiator 42, the EV radiator 52, and the condenser 62) are arranged in one plane in this embodiment, the cooling air that is introduced when the vehicle runs can be caused to act directly on the FC radiator 42, the EV radiator 52, and the condenser 62 in each of which the gas-liquid temperature difference is smaller than a gas-liquid temperature difference in a radiator for an internal combustion engine. Therefore, it is possible to reduce the possibility that the cooling air is not supplied directly to each radiator, and the cooling becomes insufficient. Also, since the heat exchangers are arranged in order of the condenser 62, the EV radiator 52, and the FC radiator 42, that is, in order of the operating temperature at the time of heat exchange, it is possible to suppress heat transmission from the FC radiator 42 whose operating temperature is high to the condenser 62 whose operating temperature is low. Further, since the heat exchangers are arranged in order of the condenser 62, the EV radiator 52, and the FC radiator 42 from the upper position to the lower position, it is possible to supply a large volume of the cooling air to the condenser 62 which needs to have high heat radiation performance, even when the vehicle speed V is low. In addition, areas of the heat exchangers, that are, areas of the condenser 62, the EV radiator 52, and the FC radiator 42 are set according to heat loads of the objects to be cooled by the condenser 62, the EV radiator 52, and the FC radiator 42, respectively. Therefore, the flow volume of the cooling air supplied to each heat exchanger can be set according to the heat load of the object to be cooled by the heat exchanger. Accordingly, it is possible to reduce the possibility that the cooling of the heat exchangers becomes insufficient due to upward and downward flows of the cooling air that is introduced when the vehicle runs.

A fan motor 72 for driving the fan 70 is fitted to a rotation shaft of the fan 70. Driving of the fan motor 72 is controlled by an electronic control unit for a hybrid vehicle (HV) (hereinafter, referred to as "HVECU") 79 based on the driving requests Frq1, Frq2, and Frq3 from the FCECU 49, the EVECU 59, and the air conditioning ECU 69. The HVECU 79 communicates with the FCECU 49, the EVECU 59, and the air conditioning ECU 69 which function as control devices for the FC cooling system 40, the driving device cooling system 50, and the air conditioning cooling system 60, respectively.

Figure 3:
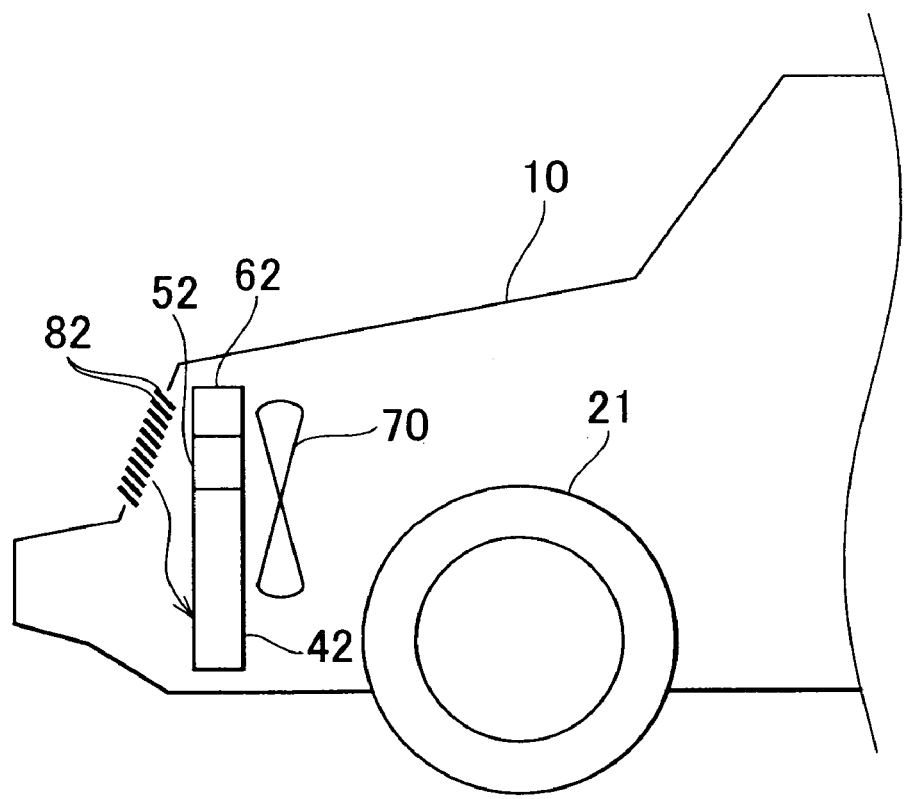
FIG. 3 is an explanatory diagram showing an example of arrangement of the heat exchangers of the cooling system 30 according to the embodiment of the invention.

The cooling air direction changing device 80 includes plural fins 82; a rotation mechanism 84; and a motor for rotation 86. The plural fins 82 constitute a part of a front grille of the vehicle. Each fin 82 is formed to have an elongate rectangular plate shape extending in a horizontal direction. The rotation mechanism 84 rotates each fin 82 around a central axis of each fin 82 extending in a longitudinal direction (i.e., in the horizontal direction) such that all the fins 82 are rotated in conjunction with each other. The motor for rotation 86 serves as a driving source for the rotation mechanism 84. Each fin 82 can be rotated from an angle at which each fin 82 is substantially horizontally oriented as shown in FIG. 2, to an angle at which a portion of each fin 82 on a vehicle-inner side (on a side where there are the FC radiator 42, the EV radiator 52, and the condenser 62) is oriented downward at 45 degrees as shown in FIG. 3. Accordingly, by changing an angle θ of the fins 82, it is possible to change the direction of the cooling air that is introduced toward the FC radiator 42, the EV radiator 52, and the condenser 62 when the vehicle runs. That is, when the angle θ of the fins 82 is 0 degree as shown in FIG. 2, the cooling air can be directed to the condenser 62 and the EV radiator 52 that are arranged in the upper position. When the angle θ of the fins 82 is 45 degrees as shown in FIG. 3, the cooling air can be directed to the FC radiator 42 that is arranged in the lower position. Driving of the motor 86 for rotation is controlled by the HVECU 79.

Figure 4:
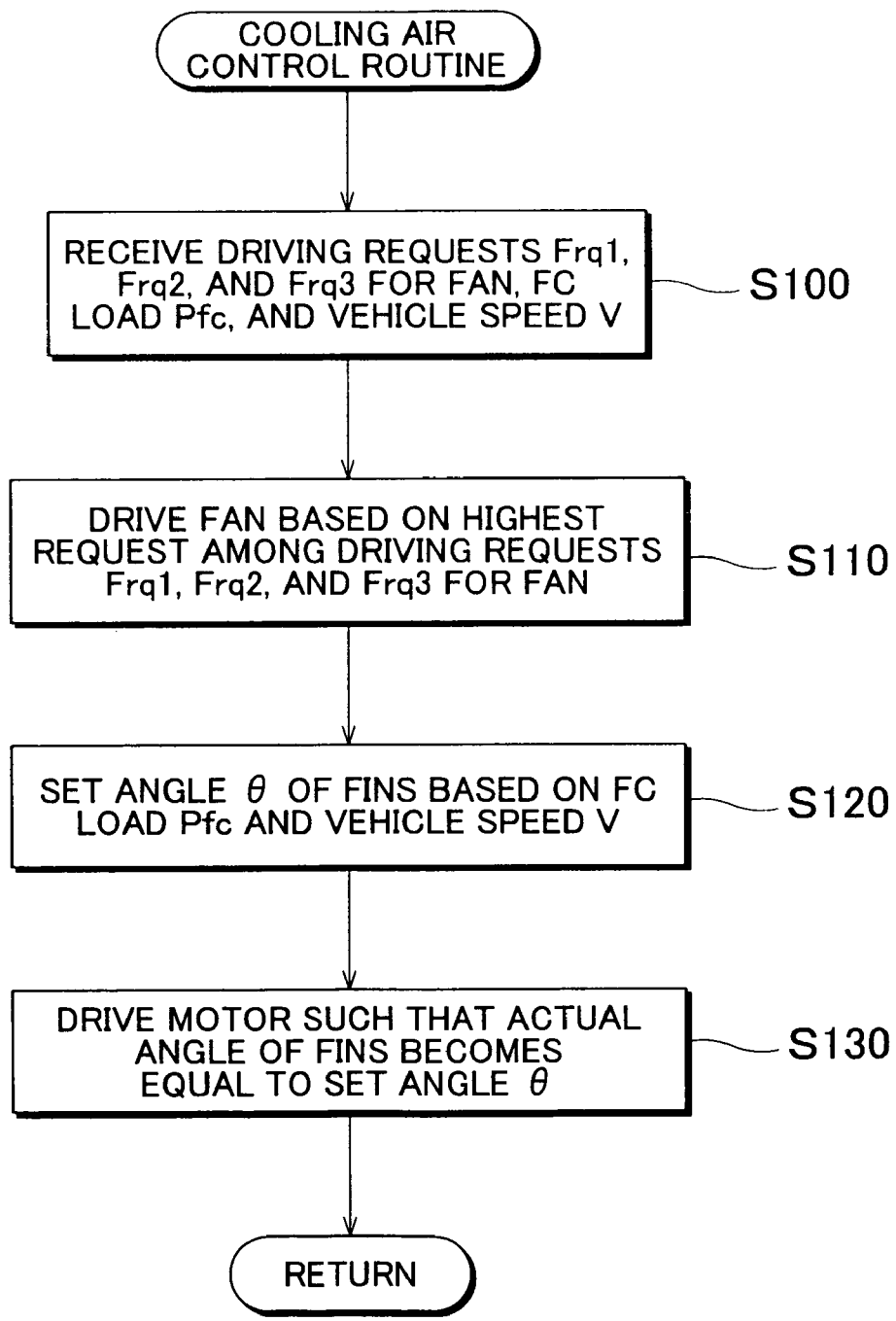
FIG. 4 is a flow chart showing an example of a cooling air control routine performed by a HVECU 79.

Next, description will be made of operation of the cooling system 30 thus configured in this embodiment, particularly, control of the cooling air. FIG. 4 is a flow chart showing an example of a cooling air control routine performed by the HVECU 79. This routine is repeatedly performed at predetermined time intervals (for example, every 100 msec).

Figure 5:
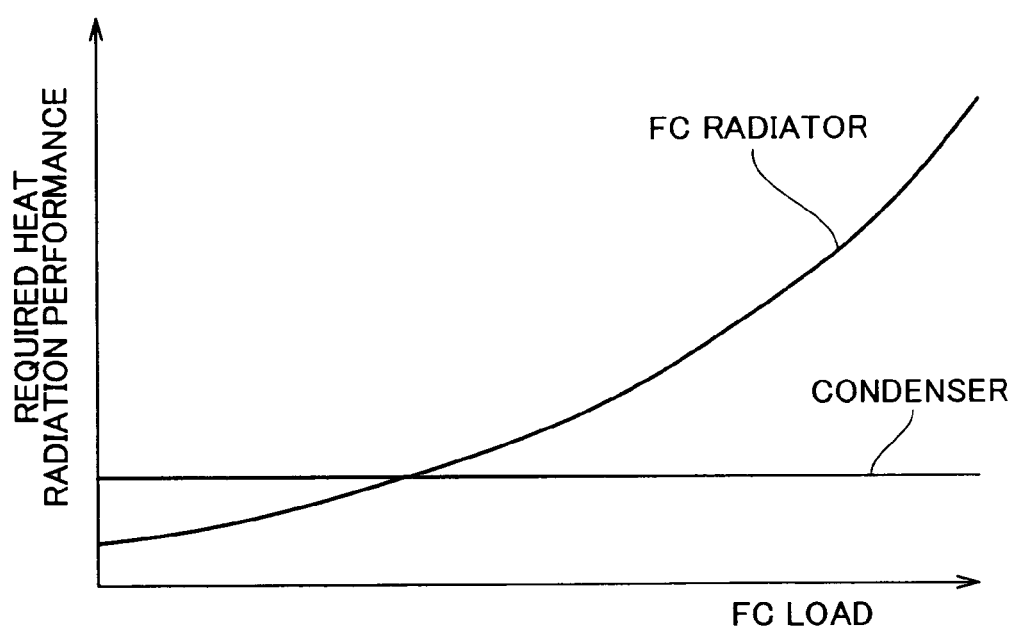
FIG. 5 is a graph showing an example of a relationship between a FC load Pfc, and heat radiation performance required of a FC radiator 42 and heat radiation performance required of a condenser 62.
Figure 6:
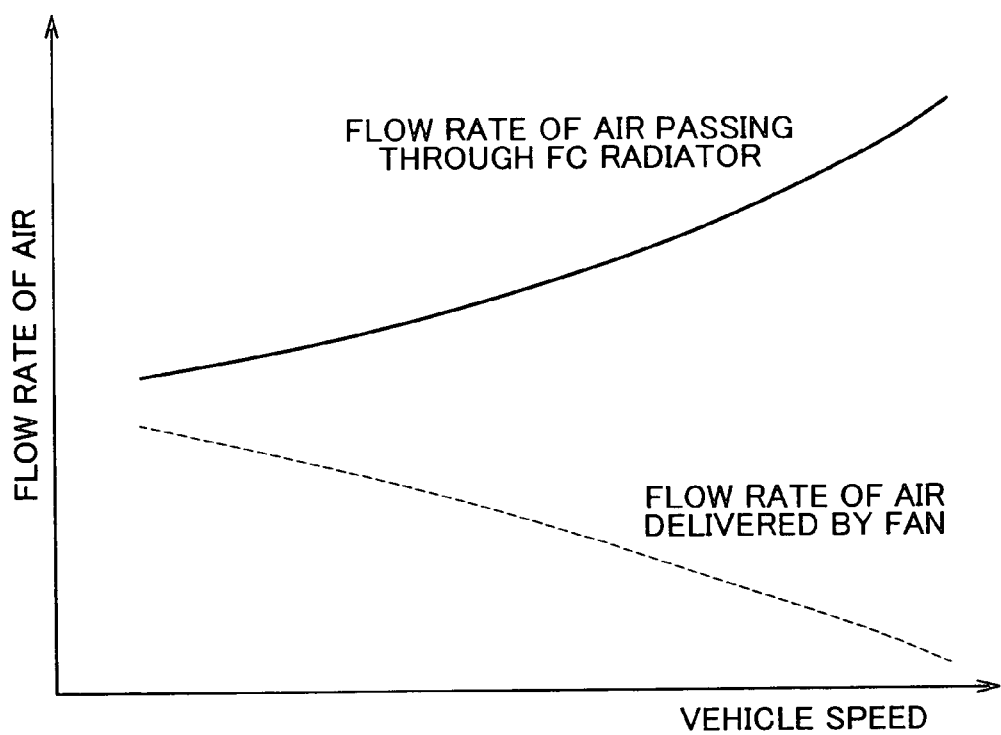
FIG. 6 is a graph showing an example of a relationship between a vehicle speed V, and a flow rate of air passing through the FC radiator 42 and a flow rate of air delivered by a fan 70.
Figure 7:
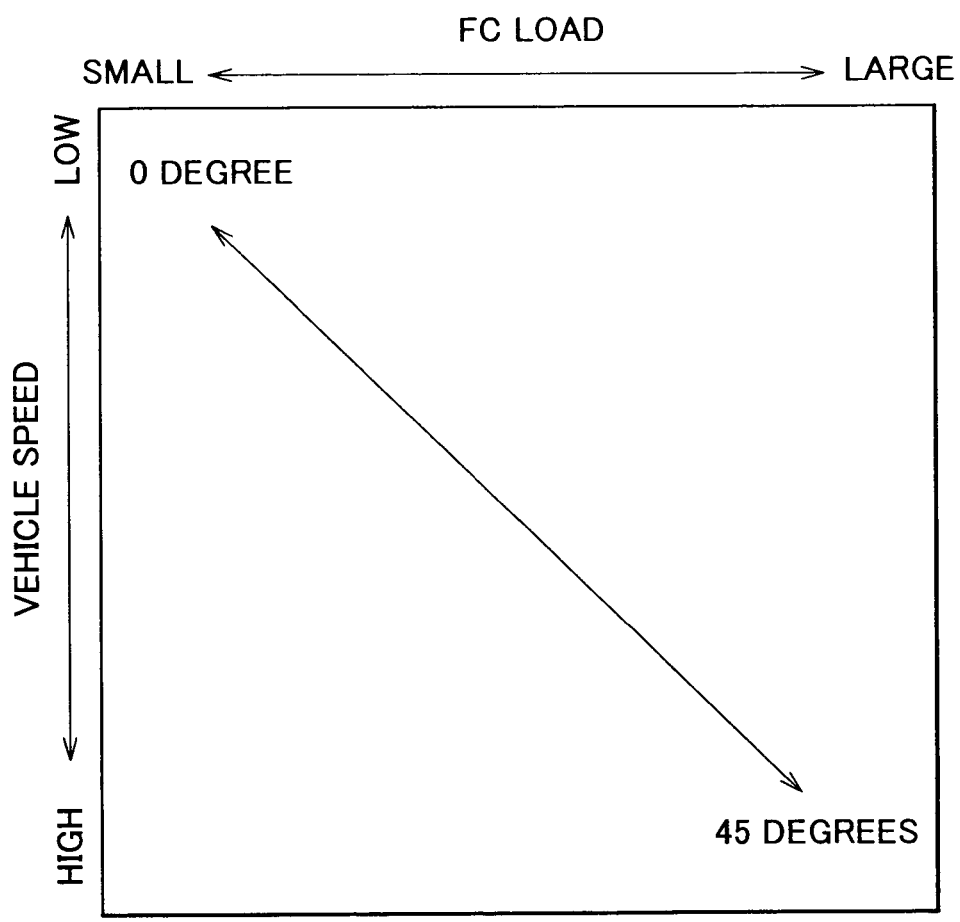
FIG. 7 is an explanatory diagram explaining a map for setting a direction of cooling air.

When the cooling air control routine is performed, first, the HVECU 79 performs a process of receiving the driving requests Frq1, Frq2, and Frq3 for the fan 70 from the FCECU 49, the EVECU 59, and the air conditioning ECU 69 which function as the control devices for the FC cooling system 40, the driving device cooling system 50, and the air conditioning cooling system 60, a load of the fuel cell device 12 (hereinafter, referred to as "FC load") Pfc from the fuel cell device 12, and the vehicle speed V from the vehicle speed sensor 28 (step S100). Subsequently, the HVECU 79 drives the fan motor 72 so that the fan 70 is driven based on the highest driving request among the driving requests Frq1, Frq2, and Frq3 (step S110). The HVECU 79 sets the angle θ of the fins 82 based on the FC load Pfc and the vehicle speed V (step S120). FIG. 5 shows an example of a relationship between the FC load Pfc, and heat radiation performance required of the FC radiator 42 and heat radiation performance required of the condenser 62. FIG. 6 is a graph showing an example of a relationship between the vehicle speed V, and a flow rate of the air passing through the FC radiator 42 and a flow rate of the air delivered by the fan 70. As shown in FIG. 5, as the FC load Pfc increases, the heat radiation performance required of the FC radiator 42 increases. However, the heat radiation performance required of the condenser 62 is substantially constant, irrespective of the FC load Pfc. Also, as shown in FIG. 6, as the vehicle speed V increases, the flow rate of the air passing through the FC radiator 42 increases, and the flow rate of the air delivered by the fan 70 decreases. Considering these facts, the angle θ of the fins 82 is set so that the cooling air is directed to the FC radiator 42 as the FC load Pfc increases, and the cooling air is directed to the FC radiator 42 as the vehicle speed V increases. In this embodiment, the relationship between FC load PFc and the vehicle speed V, and the angle θ of the fins 82 is defined in a form of a map for setting the direction of the cooling air, and is stored in a ROM (not shown) of the HVECU 79. When values of the FC load Pfc and the vehicle speed V are obtained, a value of the angle θ of the fins 82 corresponding to the values of the FC load Pfc and the vehicle speed V is obtained from the map, and the angle θ of the fins 82 is set to the obtained value. FIG. 7 is an explanatory diagram explaining the map for setting the direction of the cooling air. After the angle θ of the fins 82 is set in the aforementioned manner, the HVECU 79 drives the motor for rotation 86 of the cooling air direction changing device 80 so that an actual angle of the fins 82 becomes equal to the set angle θ (step S130). Then, the routine is finished. This control makes it possible to appropriately drive the fan 70, and to supply the cooling air to the FC radiator 42, the EV radiator 52, and the condenser 62, according to the FC load Pfc and the vehicle speed V.

In the cooling system 30 in this embodiment that has been described, the FC radiator 42 in the FC cooling system 40, the EV radiator 52 in the driving device cooling system 50, and the condenser 62 in the air conditioning cooling system 60 are arranged in one plane substantially perpendicular to a direction in which the fuel cell vehicle 10 moves forward. Also, the heat exchangers are arranged in order of the condenser 62, the EV radiator 52, and the FC radiator 42, that is, in order of the operating temperature at the time of heat exchange, from the upper position to the lower position. Therefore, the cooling air that is introduced when the vehicle runs can be directly supplied to the condenser 62, the EV radiator 52, and the FC radiator 42. In addition, it is possible to suppress heat transmission from the FC radiator 42 whose operating temperature is high to the condenser 62 whose operating temperature is low. Also, since the condenser 62 is arranged in the uppermost position, it is possible to supply a large volume of the cooling air to the condenser 62 which needs to have high heat radiation performance, even when the vehicle speed V is low. That is, the FC radiator 42, the EV radiator 52, and the condenser 62 can be more appropriately arranged. Accordingly, the FC radiator 42, the EV radiator 52, and the condenser 62 can be caused to function more efficiently. Thus, it is possible to reduce the possibility that the cooling by heat exchange becomes insufficient. Further, the areas of the heat exchangers, that are, the areas of the FC radiator 42, the EV radiator 52, and the condenser 62 are set according to heat loads of the objects to be cooled by the FC radiator 42, the EV radiator 52, and the condenser 62, respectively. Therefore, the flow volume of the cooling air supplied to each heat exchanger can be set according to the heat load of the object to be cooled by the heat exchanger. Accordingly, it is possible to reduce the possibility that cooling of the heat exchangers becomes insufficient due to upward and downward flows of the cooling air that is introduced when the vehicle runs.

Also, in the cooling system 30 in this embodiment, it is possible to supply the cooling air to the FC radiator 42, the EV radiator 52, and the condenser 62 according to the FC load Pfc and the vehicle speed V, by changing the angle θ of the fins 82 based on the FC load Pfc and the vehicle speed V. As a result, the FC radiator 42, the EV radiator 52, and the condenser 62 can be caused to function more efficiently. Accordingly, it is possible to reduce the possibility that the cooling becomes insufficient. Also, since the fan 70 is driven based on the driving requests Frq1, Frq2, and Frq3 for the fan 70 from the FC cooling system 40, the driving device cooling system 50, and the air conditioning cooling system 60, the fan 70 can be more appropriately driven, and the possibility that the cooling becomes insufficient can be reduced. That is, the flow rates of the cooling air delivered to the FC cooling system 40, the driving device cooling system 50, and the air conditioning cooling system 60 are adjusted according to amounts of heat generated by the FC cooling system 40, the driving device cooling system 50, and the air conditioning cooling system 60, respectively. Therefore, it is possible to reduce the possibility that the cooling becomes insufficient.

In the cooling system 30 in this embodiment, the angle θ of the fins 82 is changed based on the FC load Pfc and the vehicle speed V. However, the angle θ of the fins 82 may be changed based on only the FC load Pfc, or the angle θ of the fins 82 may be changed based on only the vehicle speed V. Also, the parameter used for changing the angle θ of the fins 82 is not limited to the FC load Pfc and the vehicle speed V. Various parameters may be used. For example, as the parameter, it is possible to use a running state and an operating state of the fuel cell vehicle 10 such as a road inclination and acceleration, an environmental state such as an outside air temperature, an operating state of the air conditioning cooling system 60, and a driving state of the motor for running 16.

In the cooling system 30 in the embodiment, the heat exchangers are arranged in order of the condenser 62, the EV radiator 52, and the FC radiator 42, that is, in order of the operating temperature at the time of heat exchange, from the upper position to the lower position. However, since the important thing is to arrange these heat exchangers in order of the operating temperature at the time of heat exchange, the heat exchangers may be arranged in order of the FC radiator 42, the EV radiator 52, and the condenser 62 from the upper position to the lower position. Also, when it is not necessary to consider the operating temperatures of the heat exchangers at the time of heat exchange, the heat exchangers may be arranged in order of the FC radiator 42, the condenser 62, and the EV radiator 52, in order of the EV radiator 52, the condenser 62, the FC radiator 42, in order of the condenser 62, the FC radiator 42, and the EV radiator 52, or in order of the EV radiator 52, the FC radiator 42, and the condenser 62, from the upper position to the lower position.

Figure 8:
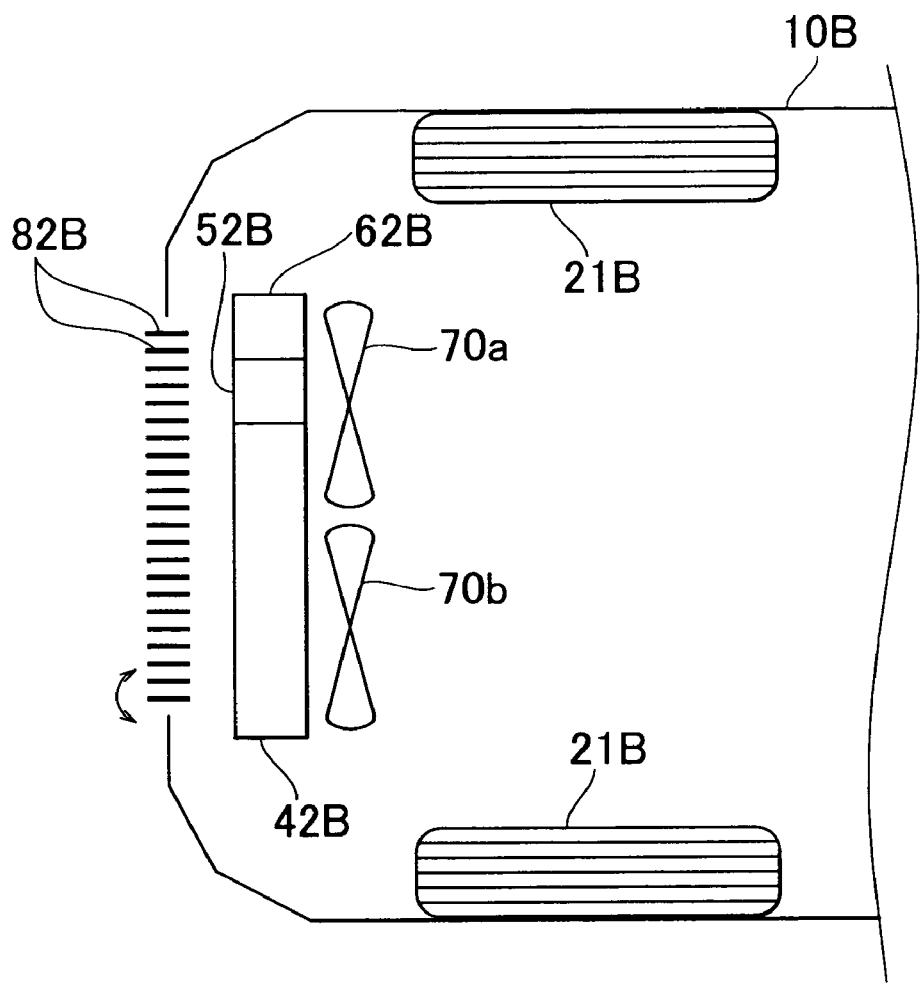
FIG. 8 is an explanatory diagram showing an example of arrangement of heat exchangers of a fuel cell vehicle 10B according to a modified example.

In the cooling system 30 in this embodiment, the heat exchangers are arranged in order of the condenser 62, the EV radiator 52, and the FC radiator 42 from the upper position to the lower position in the vertical direction. However, as in the case of a fuel cell vehicle 10B in a modified example shown in FIG. 8, the heat exchangers may be arranged in order of the FC radiator 42B, the EV radiator 52B, and the condenser 62B in a lateral direction of the vehicle, that is, in a direction perpendicular to the vertical direction. In this case, plural fins 82B are fitted to the front grille. Each fin 82B is formed to have an elongate rectangular plate shape extending in the vertical direction. Each fin 82B is rotated around a central axis of each fin 82 extending in a longitudinal direction (i.e., in the vertical direction), and all the fins 82B are rotated in conjunction with each other. Thus, an angle of the fins 82B is changed. The angle θ of the fins 82B is changed such that the cooling air is directed to the FC radiator 42 as the FC load Pfc increases, and the cooling air is directed to the FC radiator 42 as the vehicle V increases. In the case where the FC radiator 42B, the EV radiator 52B, and the condenser 62B are arranged in the direction perpendicular to the vertical direction, when it is necessary to consider suppressing heat transmission from the FC radiator 42B to the condenser 62B, it is preferable to arrange the EV radiator 52 in a center position. When it is not necessary to consider suppressing heat transmission from the FC radiator 42B to the condenser 62B, the heat exchangers may be arranged in any order.

In the cooling system 30 in this embodiment, the fuel cell device 12 is used as an electric power source. However, an electric power generating apparatus including an internal combustion engine and a generator may be used.

In this embodiment, the cooling system 30 is installed in the fuel cell vehicle 10. However, the cooling system 30 may be installed in moving bodies other than the vehicle, such as a ship and an airplane.

While the invention has been described with reference to preferred embodiments thereof, it is to be understood that the invention is not limited to the preferred embodiments or constructions. The invention can be achieved in various embodiments without departing from the true spirit of the invention.

What is claimed is:

1. A hybrid vehicle, including a fuel cell, having a cooling system which is installed in the vehicle, comprising:
    a passenger compartment including an air conditioning system;
    a driving device which drives the vehicle using electric power supplied and generated from the fuel cell;
    a first heat exchanger for the air conditioning system;
    a second heat exchanger that cools the fuel cell; and
    a third heat exchanger for a driving device
        wherein the first to third heat exchangers are arranged in one plane substantially perpendicular to a direction in which the vehicle moves, at a front portion of the vehicle, and
        wherein the first to third heat exchangers are arranged on top of one another in a vertical direction in the one plane.

2. The vehicle according to claim 1, wherein the first heat exchanger for air conditioning is arranged in an uppermost position among the first to third heat exchangers.

3. The vehicle according to claim 1, wherein the first to third heat exchangers are arranged in order of an operating temperature thereof.

4. The vehicle according to claim 1, wherein the third heat exchanger for the driving device further cools an electronic component for driving the driving device.

5. The vehicle according to claim 1, wherein the first heat exchanger for air conditioning, the third heat exchanger for the driving device, and the second heat exchanger for the fuel cell are arranged in this order.

6. The vehicle according to claim 1, further comprising cooling air direction changing means for changing a direction of cooling air that is introduced toward the first to third heat exchangers from an outside of the vehicle when the vehicle moves.

7. The vehicle according to claim 6, further comprising cooling air control means for controlling the cooling air direction changing means such that the direction of the cooling air is changed based on at least one of a moving state of the vehicle, an operating state of the vehicle, and an environmental state around the vehicle.

8. The vehicle according to claim 6, further comprising cooling air control means for controlling the cooling air direction changing means such that the direction of the cooling air is changed based on at least one of an operating state of the air conditioning system, a driving state of at least one of the driving device and the fuel cell, and a moving state of the vehicle.

9. The vehicle according to claim 1, further comprising a changing device which changes a direction of cooling air that is introduced toward the first to third heat exchangers from an outside of the vehicle when the vehicle moves.

10. The vehicle according to claim 9, further comprising a controller which controls the changing device such that the direction of the cooling air is changed based on at least one of a moving state of the vehicle, an operating state of the vehicle, and an environmental state around the vehicle.

11. The vehicle according to claim 9, further comprising a controller which controls the changing device such that the direction of the cooling air is changed based on at least one of an operating state of the air conditioning system, a driving state of at least one of the driving device and the fuel cell, and a moving state of the vehicle.

12. The vehicle according to claim 1, further comprising an air flow rate adjusting device which adjusts a flow rate of cooling air delivered to the heat exchanger for air conditioning and a flow rate of the cooling air delivered to at least one of the second heat exchanger and the third heat exchanger device according to an amount of heat generated by the air conditioning system and an amount of heat generated by at least one of the driving device and the fuel cell.

13. A hybrid vehicle, including a fuel cell, having a cooling system which is installed in the vehicle, comprising:
   a passenger compartment including an air conditioning system;
   a driving device which drives the vehicle using electric power supplied and generated from the fuel cell;
   a first heat exchanger for the air conditioning system which performs heat exchange with the outside air;
   a second heat exchanger that cools the fuel cell which performs heat exchange with the outside air; and
   a third heat exchanger for a driving device which performs heat exchange with the outside air,
      wherein the first to third heat exchangers are arranged in one plane orthogonal to a longitudinal direction of the vehicle, at a front portion of the vehicle, according to heat loads of objects to be cooled by the first to third heat exchangers, and
      wherein the first to third heat exchangers are arranged on top of one another in a vertical direction in the one plane.

14. The vehicle according to claim 13, wherein the first heat exchanger for air conditioning is arranged in an uppermost position among the plural heat exchangers.

15. The vehicle according to claim 13, wherein the first to third heat exchangers are arranged in order of an operating temperature thereof.

16. The vehicle according to claim 13, wherein the third heat exchanger for the driving device further cools an electronic component for driving the driving device.

17. The vehicle according to claim 13, wherein the first heat exchanger for air conditioning, the third heat exchanger for the driving device, and the second heat exchanger for the fuel cell are arranged in this order.

18. The vehicle according to claim 13, further comprising cooling air direction changing means for changing a direction of cooling air that is introduced toward the first to third heat exchangers from an outside of the vehicle when the vehicle moves.

19. The vehicle according to claim 18, further comprising cooling air control means for controlling the cooling air direction changing means such that the direction of the cooling air is changed based on at least one of a moving state of the vehicle, an operating state of the vehicle, and an environmental state around the vehicle.

20. The vehicle according to claim 18, further comprising cooling air control means for controlling the cooling air direction changing means such that the direction of the cooling air is changed based on at least one of an operating state of the air conditioning system, a driving state of at least one of the driving device and the fuel cell, and a moving state of the vehicle.

21. The vehicle according to claim 13, further comprising a changing device which changes a direction of cooling air that is introduced toward the first to third heat exchangers from an outside of the vehicle when the vehicle moves.

22. The vehicle according to claim 21, further comprising a controller which controls the changing device such that the direction of the cooling air is changed based on at least one of a moving state of the vehicle, an operating state of the vehicle, and an environmental state around the vehicle.

23. The vehicle according to claim 21, further comprising a controller which controls the changing device such that the direction of the cooling air is changed based on at least one of an operating state of the air conditioning system, a driving state of at least one of the driving device and the fuel cell, and a moving state of the vehicle.

24. The vehicle according to claim 13, further comprising an air flow rate adjusting device which adjusts a flow rate of cooling air delivered to the first heat exchanger for air conditioning and a flow rate of the cooling air delivered to at least one of the second heat exchanger and the third heat exchanger for the driving device according to an amount of heat generated by the air conditioning system and an amount of heat generated by at least one of the driving device and the fuel cell.

25. A hybrid vehicle, including a fuel cell, having a cooling system which is installed in the vehicle, comprising:
   a first heat exchanger for air conditioning which is used in an air conditioning system for a passenger compartment of the vehicle, and which performs heat exchange with outside air;
   a second heat exchanger that cools the fuel cell of the vehicle which performs heat exchange with the outside air;
   a third heat exchanger for a driving device which drives the vehicle using electric power supplied and generated from the fuel cell, which performs heat exchange with the outside air,
      wherein the first to third heat exchangers are arranged in one plane orthogonal to a longitudinal direction of the vehicle, at a front portion of the vehicle, according to heat loads of objects to be cooled by the first to third heat exchangers
      wherein the first to third heat exchangers are arranged in order of an operating temperature thereof,
      wherein the first heat exchanger for air conditioning is arranged in an uppermost position among the plural heat exchangers, and
      wherein the first to third heat exchangers are arranged on top of one another in a vertical direction in the one plane.

26. The vehicle of claim 1, wherein the fuel cell is a polymer electrolyte fuel cell.

* * * * *

UNITED STATES PATENT AND TRADEMARK OFFICE
CERTIFICATE OF CORRECTION

PATENT NO. : 7,621,142 B2
APPLICATION NO. : 11/121059
DATED : November 24, 2009
INVENTOR(S) : Hoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Fourteenth Day of December, 2010

David J. Kappos
*Director of the United States Patent and Trademark Office*